(12) United States Patent
Swiniarski et al.

(10) Patent No.: US 11,584,328 B2
(45) Date of Patent: Feb. 21, 2023

(54) VEHICLE AIRBAG ASSEMBLY AND ASSOCIATED METHOD OF FORMING

(71) Applicant: Ford Global Technologies, LLC, Dearborn, MI (US)

(72) Inventors: Michal Swiniarski, Brentwood (GB); Tim Scott, Benfleet (GB)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 4 days.

(21) Appl. No.: 16/922,436

(22) Filed: Jul. 7, 2020

(65) Prior Publication Data
US 2021/0009073 A1   Jan. 14, 2021

(30) Foreign Application Priority Data
Jul. 9, 2019 (GB) ..................................... 1909816

(51) Int. Cl.
*B60R 21/2165* (2011.01)
*B60R 21/205* (2011.01)
*B60R 21/215* (2011.01)

(52) U.S. Cl.
CPC ........ *B60R 21/2165* (2013.01); *B60R 21/205* (2013.01); *B60R 2021/21506* (2013.01)

(58) Field of Classification Search
CPC . B60R 21/205; B60R 21/215; B60R 21/2176; B60R 2021/21506; B60R 2021/21531
See application file for complete search history.

(56) References Cited

U.S. PATENT DOCUMENTS

| | | | |
|---|---|---|---|
| 5,062,664 A * | 11/1991 | Bishop | B60R 21/2176 280/728.2 |
| 5,096,221 A | 3/1992 | Combs et al. | |
| 5,211,421 A * | 5/1993 | Catron | B60R 21/215 280/728.2 |
| 5,433,474 A * | 7/1995 | Farrington | B60R 21/2165 280/728.3 |
| 5,549,324 A | 8/1996 | Labrie et al. | |
| 5,584,502 A | 12/1996 | Phillion et al. | |
| 5,803,485 A * | 9/1998 | Acker | B60R 21/207 280/728.2 |

(Continued)

FOREIGN PATENT DOCUMENTS

| | | |
|---|---|---|
| GB | 2362858 A1 | 12/2001 |
| JP | 2000247199 A | 9/2000 |

OTHER PUBLICATIONS

UK Examination and Search Report dated Dec. 3, 2019 re Appl. No. GB1909816.9.

*Primary Examiner* — Barry Gooden, Jr.
(74) *Attorney, Agent, or Firm* — Frank A. MacKenzie; Bejin Bieneman PLC

(57) ABSTRACT

An assembly includes an airbag, a trim panel, and an airbag container having a sidewall defining a cavity receiving the airbag. The airbag container has an opening through which the airbag is deployable. A flexible membrane cover extends over the opening. A spacer portion is coupled to the membrane cover. The spacer portion is configured to extend proud of the sidewall. The spacer portion resides within a gap between the trim panel and the airbag container and touches the trim panel to resist deflection of the trim panel.

20 Claims, 9 Drawing Sheets

(56) References Cited

U.S. PATENT DOCUMENTS

| | | | | |
|---|---|---|---|---|
| 5,810,390 | A * | 9/1998 | Enders | B60R 21/2176 |
| | | | | 280/728.2 |
| 5,988,677 | A * | 11/1999 | Adomeit | B60R 21/205 |
| | | | | 280/736 |
| 6,131,950 | A * | 10/2000 | Schroter | B60R 21/205 |
| | | | | 280/753 |
| 6,474,686 | B1 * | 11/2002 | Higuchi | B60R 21/203 |
| | | | | 280/731 |
| 7,150,470 | B2 * | 12/2006 | Okada | B60R 21/205 |
| | | | | 280/743.1 |
| 7,753,403 | B2 * | 7/2010 | Fukawatase | B60R 21/206 |
| | | | | 280/730.1 |
| 7,770,925 | B2 * | 8/2010 | Seymour | B60R 21/205 |
| | | | | 280/743.1 |
| 8,272,664 | B2 * | 9/2012 | Benny | B60R 21/239 |
| | | | | 280/728.1 |
| 8,407,968 | B2 * | 4/2013 | Lachat | B60R 21/201 |
| | | | | 53/429 |
| 8,608,195 | B2 * | 12/2013 | Yamada | B60R 21/201 |
| | | | | 280/732 |
| 2002/0074776 | A1 | 6/2002 | Labrie et al. | |
| 2003/0001366 | A1 * | 1/2003 | Debler | B60H 1/00564 |
| | | | | 280/732 |
| 2004/0232662 | A1 * | 11/2004 | Loeper | B60R 21/2155 |
| | | | | 280/728.3 |
| 2005/0212269 | A1 * | 9/2005 | Schneider | B60R 21/205 |
| | | | | 280/728.3 |
| 2006/0071459 | A1 * | 4/2006 | Hayakawa | B60R 21/206 |
| | | | | 280/730.1 |
| 2007/0057487 | A1 * | 3/2007 | Kim | B60R 21/201 |
| | | | | 280/728.2 |
| 2007/0120346 | A1 * | 5/2007 | Kwon | B60R 21/2165 |
| | | | | 280/728.2 |
| 2007/0138779 | A1 * | 6/2007 | Kwon | B60R 21/205 |
| | | | | 280/743.2 |
| 2008/0048419 | A1 | 2/2008 | Kong | |
| 2008/0111355 | A1 * | 5/2008 | Zink | B60R 21/207 |
| | | | | 280/730.2 |
| 2008/0217887 | A1 * | 9/2008 | Seymour | B60R 21/2338 |
| | | | | 280/728.2 |
| 2008/0217888 | A1 * | 9/2008 | Fukawatase | B60R 21/2032 |
| | | | | 280/730.1 |
| 2009/0079167 | A1 * | 3/2009 | Shimazaki | B60R 21/231 |
| | | | | 280/728.2 |
| 2009/0152842 | A1 * | 6/2009 | Benny | B60R 21/2338 |
| | | | | 280/728.3 |
| 2009/0295136 | A1 | 12/2009 | Kumagai et al. | |
| 2010/0207366 | A1 | 8/2010 | Evans et al. | |
| 2010/0230935 | A1 * | 9/2010 | Rose | B60R 21/201 |
| | | | | 280/728.2 |
| 2010/0244410 | A1 * | 9/2010 | Chavez | B60R 21/215 |
| | | | | 280/728.2 |
| 2010/0327565 | A1 * | 12/2010 | Wagner | B60R 21/201 |
| | | | | 280/728.2 |
| 2011/0049850 | A1 | 3/2011 | Horikawa et al. | |
| 2011/0088356 | A1 * | 4/2011 | Lachat | B60R 21/201 |
| | | | | 53/429 |
| 2011/0148077 | A1 * | 6/2011 | Enders | B60R 21/215 |
| | | | | 280/728.2 |
| 2012/0049488 | A1 * | 3/2012 | Enders | B60R 21/206 |
| | | | | 280/728.3 |
| 2014/0291971 | A1 * | 10/2014 | Fukurono | B60R 21/2165 |
| | | | | 280/728.3 |
| 2014/0375025 | A1 | 12/2014 | Pauthier et al. | |
| 2014/0375029 | A1 | 12/2014 | Pauthier et al. | |
| 2015/0321635 | A1 | 11/2015 | Luckett et al. | |
| 2016/0214563 | A1 * | 7/2016 | Kunitake | B60R 21/215 |
| 2018/0037185 | A1 * | 2/2018 | Minami | B60R 21/217 |
| 2020/0148153 | A1 * | 5/2020 | Hioda | B60R 21/215 |
| 2020/0238940 | A1 * | 7/2020 | Swiniarski | B60R 21/2171 |

* cited by examiner

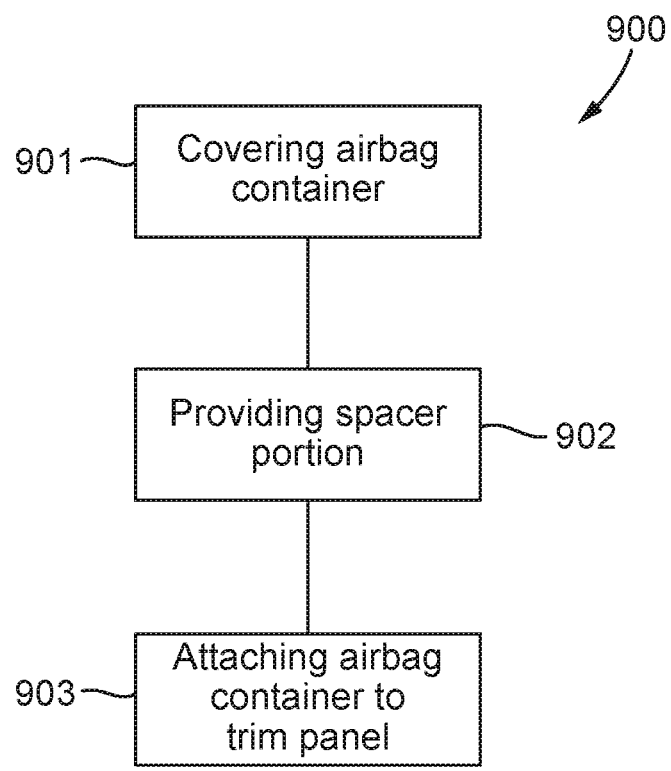

VEHICLE AIRBAG ASSEMBLY AND ASSOCIATED METHOD OF FORMING

CROSS-REFERENCE TO RELATED APPLICATION

This patent application claims priority to United Kingdom Application No. GB 1909816.9 filed on Jul. 9, 2019 which is hereby incorporated by reference in its entirety.

FIELD OF THE DISCLOSURE

This disclosure relates to a vehicle airbag assembly and method, and in particular, but not exclusively, relates to a piece of airbag trim that is configured to resist deflection from within the passenger compartment of the vehicle.

INTRODUCTION

A modern vehicle, such as a car or a truck, is typically fitted with one or more airbags. For example, a vehicle may be fitted with a first airbag that deploys from a steering wheel of the vehicle and a second airbag that deploys from a trim panel of the vehicle, such as a dashboard trim panel.

In many cases, a trim panel is used to conceal the airbag behind the trim panel, e.g., within a body portion of the vehicle. In order for the airbag to deploy from behind the trim panel, the trim panel may be provided with a frangible portion that is configured to break or tear open upon the application of a force provided by the airbag as it rapidly inflates and expands from its position behind the trim.

On the one hand, the trim panel must be weak enough to break open to effect the deployment of an airbag, and on the other hand, the trim panel must be sturdy enough to not break as a result of routine use. The present disclosure provides a solution, for example for commercial vehicles, in which trim panels should be extremely durable in order to cope with the tough working requirements of the vehicle.

STATEMENTS OF THE DISCLOSURE

According to an aspect of the present disclosure there is provided an airbag container (such as an airbag canister) for a vehicle, the airbag container being configured to engage a trim panel of the vehicle and including:

a sidewall defining a cavity for receiving an airbag;

an opening through which the airbag deploys;

a flexible membrane cover extending over the opening; and a spacer portion coupled to the membrane cover, the spacer portion being configured to extend proud of the sidewall.

The spacer portion may include a gathering of material, such as a sheet material. For example, the material may be rolled up, pleated, folded, bunched or any other form of gathering in which material is brought together. The material may be formed from a fabric (whether woven or unwoven), cloth, leather or any other sheet-like material.

The gathering of material may be formed from the flexible membrane cover. A portion of the flexible membrane cover may be gathered to form the spacer portion. The gathering of material may be a gathering of the same material as the flexible membrane cover. In other words, the flexible membrane may be gathered at one or more points to form the spacer portion. Alternatively, the spacer material may be formed from a different material to that of the membrane cover. In either case, the gathering of material may be held in place by stitching.

The spacer portion may include a rigid or semi-rigid element. The spacer portion may include the gathering of material and the rigid or semi-rigid element. The gathering of material may be gathered, e.g., rolled, folded or pleated, around the rigid or semi-rigid element.

The flexible membrane may include two or more layers. The spacer portion may include a stiffening feature, e.g., layer, provided between layers of the flexible membrane.

The spacer portion may be elongate. The spacer portion may extend in a direction substantially parallel (or perpendicular) to a longitudinal axis of the airbag container. The spacer portion may span the container opening. For example, the gathering may extend over edges of opposing sidewalls of the container. Additionally or alternatively, the rigid or semi-rigid element may extend over edges of opposing sidewalls of the container.

The flexible membrane cover may include a frangible portion configured to break upon deployment of the airbag. The frangible portion may include a series of perforations. The frangible portion may be provided at or near, e.g., alongside, the spacer portion.

The membrane cover may include at least one opening configured to receive a corresponding tab provided on the sidewall. The tab may be configured to engage a corresponding opening on the trim panel.

According to another aspect of the present disclosure there is provided an airbag assembly including the aforementioned airbag container and the trim panel, wherein the spacer portion resides within a gap between the trim panel and the airbag container and the spacer portion resists deflection of the trim panel.

The trim panel may further include a perimeter wall extending from an inner surface of the trim panel. The perimeter wall may be configured to receive the airbag container and may substantially surround the opening. The airbag container may cooperate with engaging portions, e.g., openings, on the perimeter wall to hold the airbag container in place.

The trim panel may include a tear-open airbag deployment region formed from a plurality of sections, e.g., doors, which cooperate to cover the airbag in an installed configuration. The sections may be joined by a tear seam. The panel may be formed such that the sections and tear seam are unitary in structure, i.e. formed from a single piece of material. The tear-open airbag deployment region may be formed from two sections. Each of the sections may cover approximately half of the tear-open airbag deployment region.

In particular, the trim panel may include at least one door having an outer surface configured to face a vehicle cabin and an inner surface configured to face the airbag prior to deployment. In a pre-deployed state, the door may extend across an opening. The door may be movably coupled to a rim of the vehicle trim panel such that the door is configured to open upon deployment of the airbag to permit passage of the airbag through the opening. At least one edge of the door may have a tear seam that couples the door to a corresponding edge of the vehicle trim panel and breaks upon deployment of the airbag.

The tear-open airbag deployment region may be elongate and may extend in a longitudinal direction of the trim panel. The tear seam may include an elongate channel formed in the airbag-facing inner surface of the vehicle trim panel.

According to another aspect of the present disclosure there is provided a vehicle including the aforementioned airbag assembly.

According to another aspect of the present disclosure there is provided a method of forming an airbag assembly, the method including:

covering the opening of an airbag container with a flexible membrane cover;

providing a spacer portion coupled to the membrane cover; and attaching the airbag container to a vehicle trim panel, the spacer portion residing within a gap between the trim panel and the airbag container such that the spacer portion resists deflection of the trim panel.

The method may further include retro-fitting the flexible membrane cover and spacer portion to an existing airbag container.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

BRIEF DESCRIPTION OF THE DRAWINGS

For a better understanding of the present disclosure, and to show more clearly how it may be carried into effect, reference will now be made, by way of example, to the accompanying drawings, in which:

FIG. 9 is a flowchart depicting a method according to the present disclosure.

DETAILED DESCRIPTION

The present disclosure relates to a vehicle airbag assembly for a vehicle, such as a motor vehicle (e.g., car, van, truck, motorcycle etc.), marine vessel, aircraft or any other type of vehicle. In particular, the vehicle airbag assembly includes a trim panel configured to conceal an airbag within a portion of the vehicle, such as within a dashboard of the vehicle.

Figure 1:
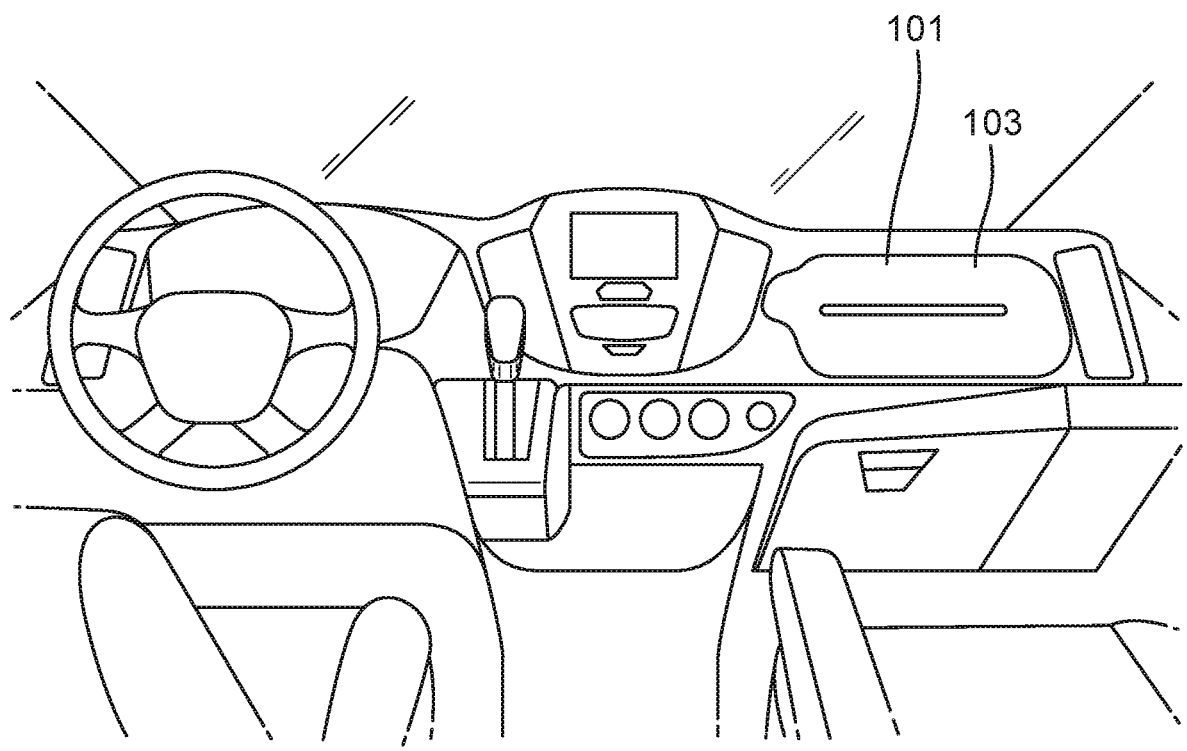
FIG. 1 shows a dashboard of a vehicle.

FIG. 1 shows a dashboard of a vehicle, the dashboard having a trim panel 101 configured to cover a front passenger-side airbag. However, the trim panel 101 may be any appropriate type of trim panel. For example, the trim panel 101 may be configured to cover, e.g., conceal, any type of airbag of the vehicle, such as a side curtain airbag, side door airbag, knee airbag, front driver-side airbag or any other type of airbag.

In order to allow the airbag to deploy from behind the trim panel 101, the trim panel 101 includes a tear-open airbag deployment region 103 that is configured to break and open in an outward manner, i.e. into the passenger compartment of the vehicle, as a result of the rapid inflation and expansion of the airbag. Typically, in previously-proposed arrangements, the tear-open airbag deployment region 103 (hereinafter referred to as the region 103) includes a single section, e.g., a door, configured to cover the airbag in an installed configuration. In a first operative state, e.g., where the airbag has not been deployed, the door is connected to the trim panel 101 along one edge of the door by virtue of a hinge, and is connected to the trim panel 101 on the remainder of its edges by a tear seam, which is usually provided on the airbag-facing side of the trim panel 101.

In a second operative state, where the airbag has been deployed, the door remains connected to the trim panel 101 by virtue of the hinge, but becomes broken away from the remainder of the trim panel 101 at the weakened region provided by the tear seam, as a result of the force applied to the airbag-facing side of the trim panel 101 upon the rapid inflation and expansion of the airbag. In many instances the hinge is formed integral to the trim panel 101, e.g., by providing a line of weakness in the trim panel 101 about which the door can pivot, but not break away from under the force of the expanding airbag.

One way in which the deployment time of an airbag can be reduced, is to provide a plurality of smaller sections, e.g., smaller doors that cooperate to cover the airbag in an installed configuration. For example, the region 103 may include a plurality of sections joined by a tear seam. However, in contrast to a trim panel that has a single tear-open section, the tear seam of a trim panel having multiple tear-open sections is located away from the periphery of the region 103. As a result of the position of the tear seam, it is unable to be supported by another component, such as the instrument panel. As such, the tear seam is at risk of being broken by the application of a force to the trim panel 101 from the passenger-facing side of the trim panel 101. Such a problem may be of particular concern for larger trim panels, e.g., a trim panel for a dashboard of a commercial vehicle, since such trim panels may be regularly exposed to loading, e.g., as a result of an occupant of the vehicle leaning on the dashboard.

On the one hand, the trim panel must be weak enough to break open to effect the deployment of an airbag, and on the other hand, the trim panel must be sturdy enough to not break as a result of routine use. The present disclosure provides a solution.

Figure 2:
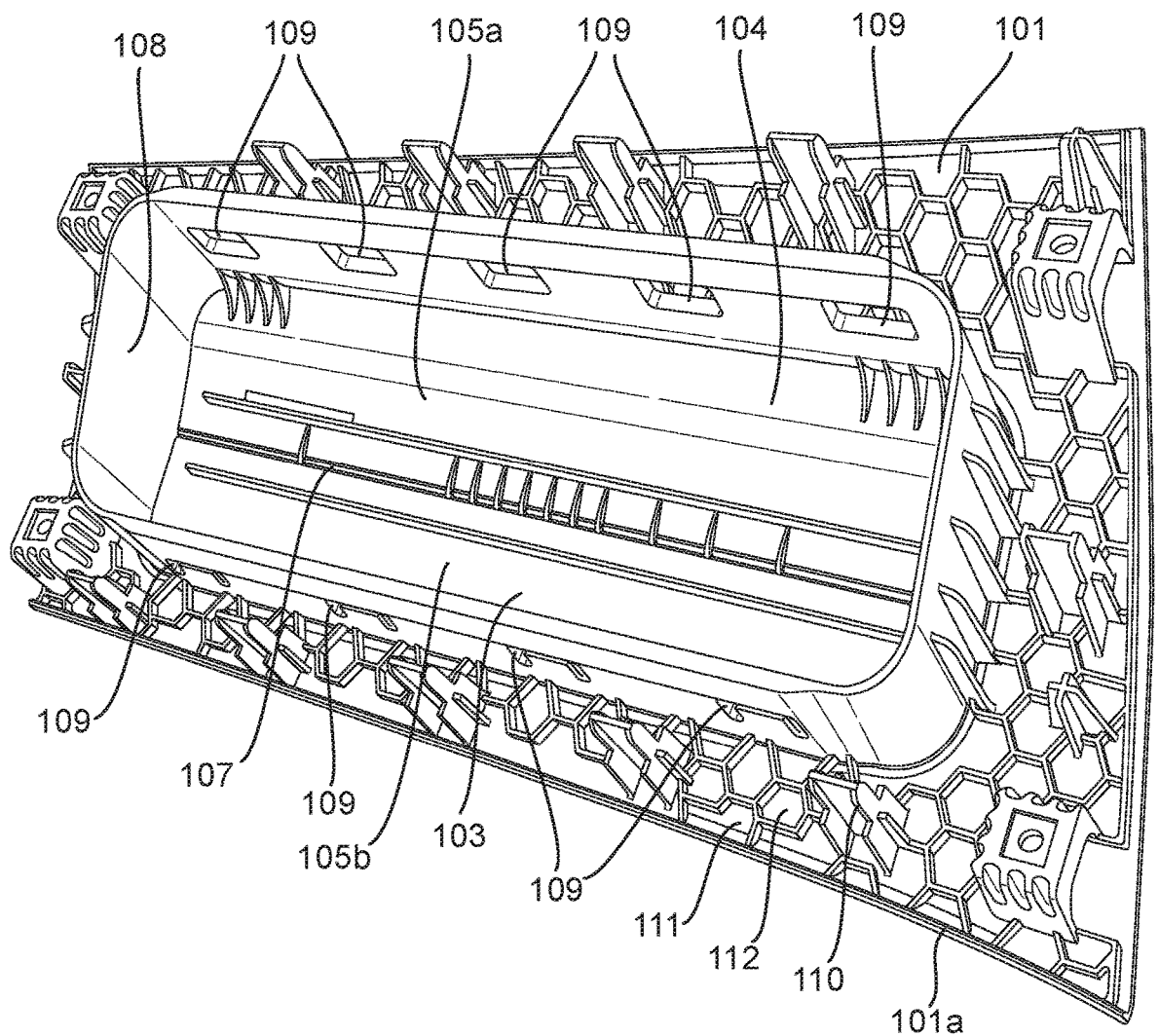
FIG. 2 is a rear perspective view of an interior trim panel of a vehicle.

FIG. 2 shows an inner surface 111 on an airbag-facing side of the panel 101. The panel 101 includes the region 103 having two door sections 105a, 105b that are joined towards the middle of the panel 101 by a tear seam 107. The region 103 may cover an opening 104 through which the airbag may deploy. The tear seam 107 may be spaced apart from edges of the region 103. In the arrangement shown in FIG. 2, each of the door sections 105a, 105b are approximately equal in size, such that each door section 105a, 105b covers approximately half of the region 103. However, in one or more other arrangements, the door sections 105a, 105b may be of any appropriate size and shape. Indeed, the panel 101 may include any appropriate number of door sections (e.g., one or more sections) that cooperate to cover the airbag when the panel 101 is installed to a vehicle.

In the arrangement shown in FIG. 2, the panel 101 is formed from a single piece of material. For example, the panel 101 may be formed from a single piece of polymeric material, e.g., by virtue of an injection moulding process. As such, when viewed from a passenger-facing side, the region 103 includes a single unbroken surface that extends across the door sections 105a, 105b and the tear seam 107. In this manner, a passenger of the vehicle may be unaware that the panel 101 is formed from one or more door sections 105a, 105b, and/or that the panel 101 includes a weakened region around the tear seam.

When viewed from the airbag-facing side, one of the door sections 105a extends from a top peripheral edge of the opening 104 towards the middle of opening, and the other of the door sections 105b extends from a bottom peripheral edge of the opening 104 towards the middle of the opening. The trim panel 101 and door sections 105a, 105b may be elongate. The tear seam 107 between the door sections 105a, 105b may extend in a substantially longitudinal direction of the panel 101. However, it is also envisaged that the door sections 105a, 105b and/or tear seam 107 may extend in any appropriate direction to cover the airbag.

The panel 101 further includes a perimeter wall 108 extending from the inner surface 111 of the vehicle trim panel and substantially surrounding the opening 104. The perimeter wall 108 may form a substantially tubular construction that is closed at one end by the door sections 105a, 105b prior to deployment of the airbag. The substantially tubular construction formed by the perimeter wall 108 may receive an airbag canister 130 (shown in FIG. 3) in which the airbag may be provided. The perimeter wall 108 may include a number of engaging portions, e.g., openings 109, for receiving cooperating parts of the canister to secure the airbag canister in place.

The perimeter wall 108 may be set back from edges 101a of the trim panel 101. Fixings 110 may be provided on the inner surface 111 of the trim panel to fasten the trim panel 101 to an underlying structure. Such fixings 110 may be provided on a rim 112 between the edges 101a of the trim panel 101 and the perimeter wall 108. Outer (cabin facing) surfaces of the door sections 105a, 105b may together be contiguous and continuous with an outer surface of the rim 112.

The tear seam 107 joins the two door sections 105a, 105b towards the middle of the panel 101. In the arrangement shown in FIG. 2, the tear seam 107 includes a channel that extends across the opening 104. The tear seam 107 is configured to reduce locally the thickness of the panel 101 to provide a line of weakness in the panel 101, such that the tear-open airbag deployment region 103 bursts open upon the activation of an airbag provided behind the panel 101. As mentioned above, where an airbag panel 101 has a tear seam 107 provided across the middle of the airbag deployment region 103, it is difficult to support the door sections 105a, 105b of the panel 101 to resist the application of force from the passenger-facing side of the panel 101. As such, an airbag panel having a plurality of sections, or doors, may be prone to inadvertent damage during everyday use of the vehicle to which the panel is installed.

Figure 3:
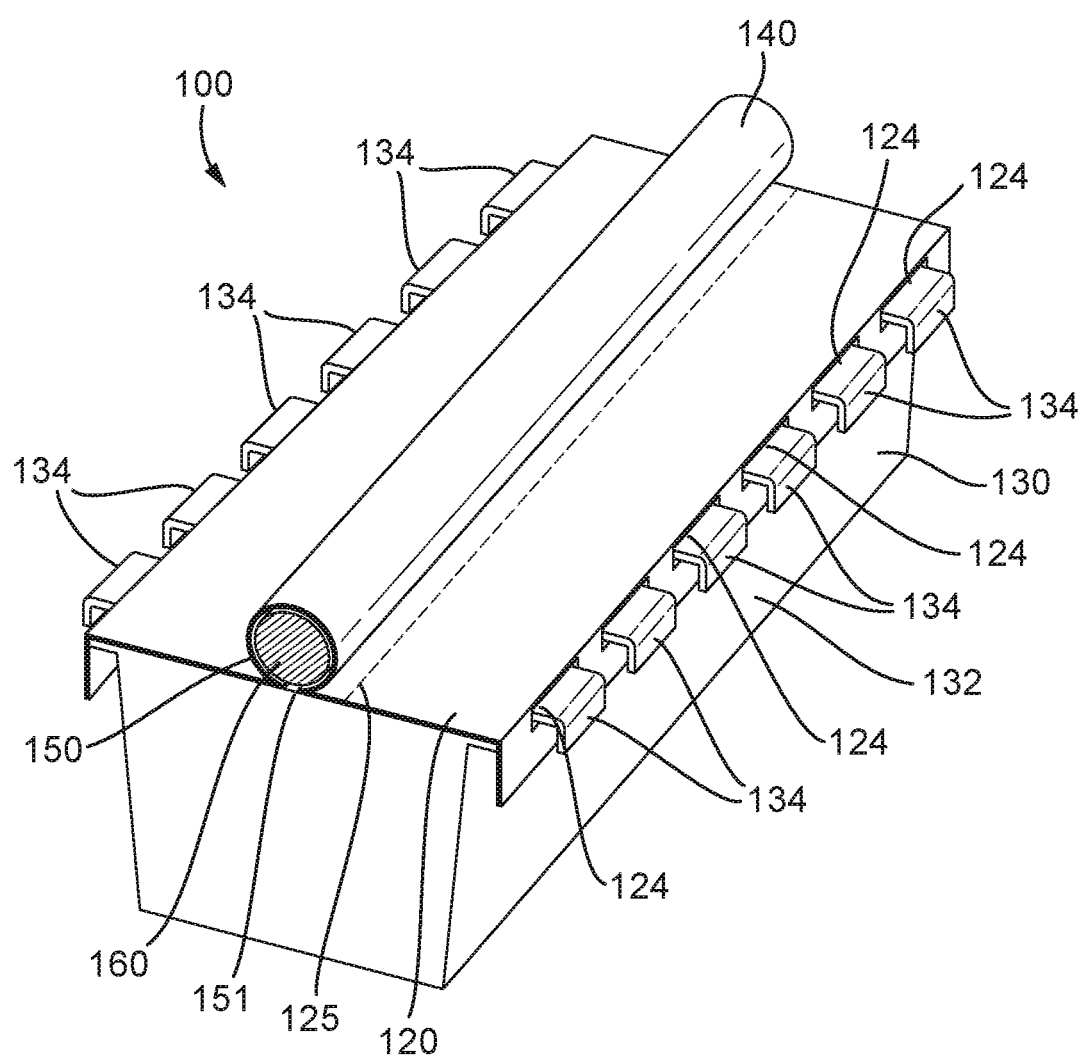
FIG. 3 is a schematic perspective view of a vehicle airbag assembly including a flexible membrane according to a first example of the present disclosure.

With reference to FIG. 3, a vehicle airbag assembly 100 according to the present disclosure includes an airbag container, e.g., airbag canister 130. As mentioned above, the airbag canister 130 is received within the tubular construction formed by the perimeter wall 108 of the trim panel 101. The canister 130 includes a sidewall 132, which defines a cavity for receiving the airbag. The trim panel perimeter wall 108 may include a number of engaging portions, e.g., openings 109, for receiving cooperating parts, e.g., tabs 134, of the canister to secure the airbag canister in place. The tabs 134 may extend from the sidewall 132, e.g., along opposing edges, and may be received in the openings 109 of the trim panel perimeter wall 108.

The vehicle airbag assembly 100 further includes a flexible membrane cover 120 that extends across an opening of the canister 130 through which the airbag deploys. The flexible membrane cover 120 may be formed from a fabric (whether woven or unwoven), cloth, leather or any other sheet-like material. By way of example, the membrane may include a layer of paper. The membrane cover 120 may include a coating. For example, the coating may include a plastics material, such as polyester, polyethylene, Tyvek® or any other suitable coating.

The flexible membrane 120 may connect to one or more of the tabs 134 at each side of the canister 130. Edges of the flexible membrane cover 120 may have openings 124, which receive the tabs 134. The membrane cover 120 may be configured (e.g., sized) so as to be taut when stretched across the opening of the canister 130.

The vehicle airbag assembly 100 further includes a spacer portion 140 coupled to the membrane cover 120. The spacer portion 140 is configured to extend proud of the canister sidewall 132 and flexible membrane cover 120. The spacer portion 140 is configured to reside within a gap between the trim panel 101 and the canister 130 such that the spacer portion resists deformation of the trim panel.

As depicted, the spacer portion 140 may be elongate. The spacer portion 140 may extend between ends (or sides) of the canister 130. In particular, the spacer portion 140 may extend in a direction substantially parallel to a longitudinal axis of the canister 130, although in an alternative arrangement the spacer portion 140 may extend in a direction substantially perpendicular to the longitudinal axis of the canister. The spacer portion 140 may span the opening of the canister 130 through which the airbag deploys.

The spacer portion 140 may include a gathering of material 150, in particular formed from the material of the flexible membrane cover 120. In other words, a portion of the flexible membrane cover 120 may be gathered to form at least a portion of the spacer portion. Alternatively, the spacer portion material may be separate from the membrane cover 120. In either case, the gathering of material 150 may be secured to itself and/or to the membrane cover 120 by stitching, an adhesive, welding or any other form of connection.

The material forming the gathering of material 150 may be collected, rolled up, pleated, folded, ruched, bunched or any other form of gathering in which material is brought together. For example, in the particular example shown in FIG. 3, a portion of the flexible membrane cover 120 is rolled up to form a roll that extends lengthways along the canister 130. The gathering of material 150 may extend over ends of the canister 130, e.g., so that the gathering of material is supported by the canister ends. To keep the gathering of material 150 demarcated from the remainder of the membrane cover that extends over the canister 130, the gathering of material may be held together at its root 151 by stitching, an adhesive, welding or any other form of connection.

In addition to the gathering of material 150, the spacer portion 140 may include a rigid or semi-rigid element 160. The gathering of material 150 may be gathered around or on the element 160 and, in the particular example shown in FIG. 3, the material is rolled around the element 160. The element 160 may be circular in cross-section and may or may not be tubular in construction. The element 160 may be formed from a lightweight material, such as a foam-type material, or any other material that adds rigidity to the gathering of material 150. The gathering of material 150 may or may not be joined to the element 160, e.g., by virtue of stitching, an adhesive, welding or any other form of connection.

The element 160 may be elongate and may extend lengthways along the canister 130. The element 160 may extend over ends of the canister 130, e.g., so that the element 160 is supported by the canister ends.

The flexible membrane cover 120 may include a frangible portion 125 configured to break upon deployment of the airbag. The frangible portion 125 may be elongate and may extend between ends of the canister 130. In particular, the frangible portion 125 may extend in a direction substantially parallel to the longitudinal axis of the canister and the frangible portion 125 may be provided alongside the spacer portion 140. In the depicted example, the frangible portion 125 may include a series of perforations in the material forming the membrane cover 120. Upon deployment of the airbag, the pressure of the deploying airbag breaks (e.g., tears) the frangible portion 125 in the membrane cover 120 and the membrane cover divides, thereby permitting the passage of the airbag.

Figure 4:
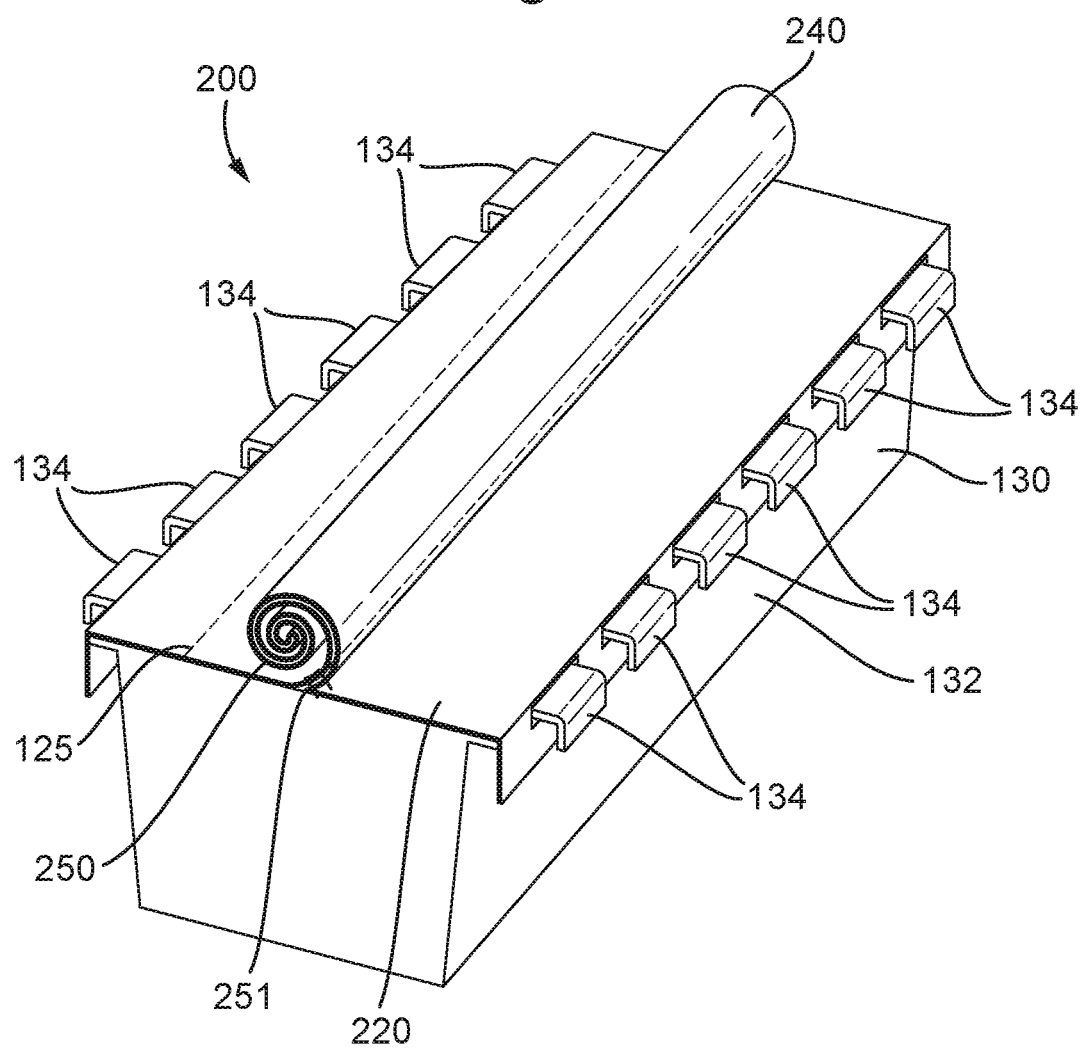
FIG. 4 is a schematic perspective view of a vehicle airbag assembly including a flexible membrane according to a second example of the present disclosure.

With reference to FIG. 4, a vehicle airbag assembly 200 according to a second example of the present disclosure will now be described. The vehicle airbag assembly 200 includes a flexible membrane cover 220 and a spacer portion 240 formed from a gathering of material 250. Where compatible any of the features of the first example may apply to the second example.

In the second example of the present disclosure the gathering of material 250 is rolled around itself so as to form a spiral. As for the first example, the roll of material forming the spiral may be held together at its root 251 by stitching, an adhesive, welding or any other form of connection. Furthermore, adjacent layers of the spiral may be joined together, e.g., by stitching, an adhesive, welding or any other form of connection.

Figure 5:
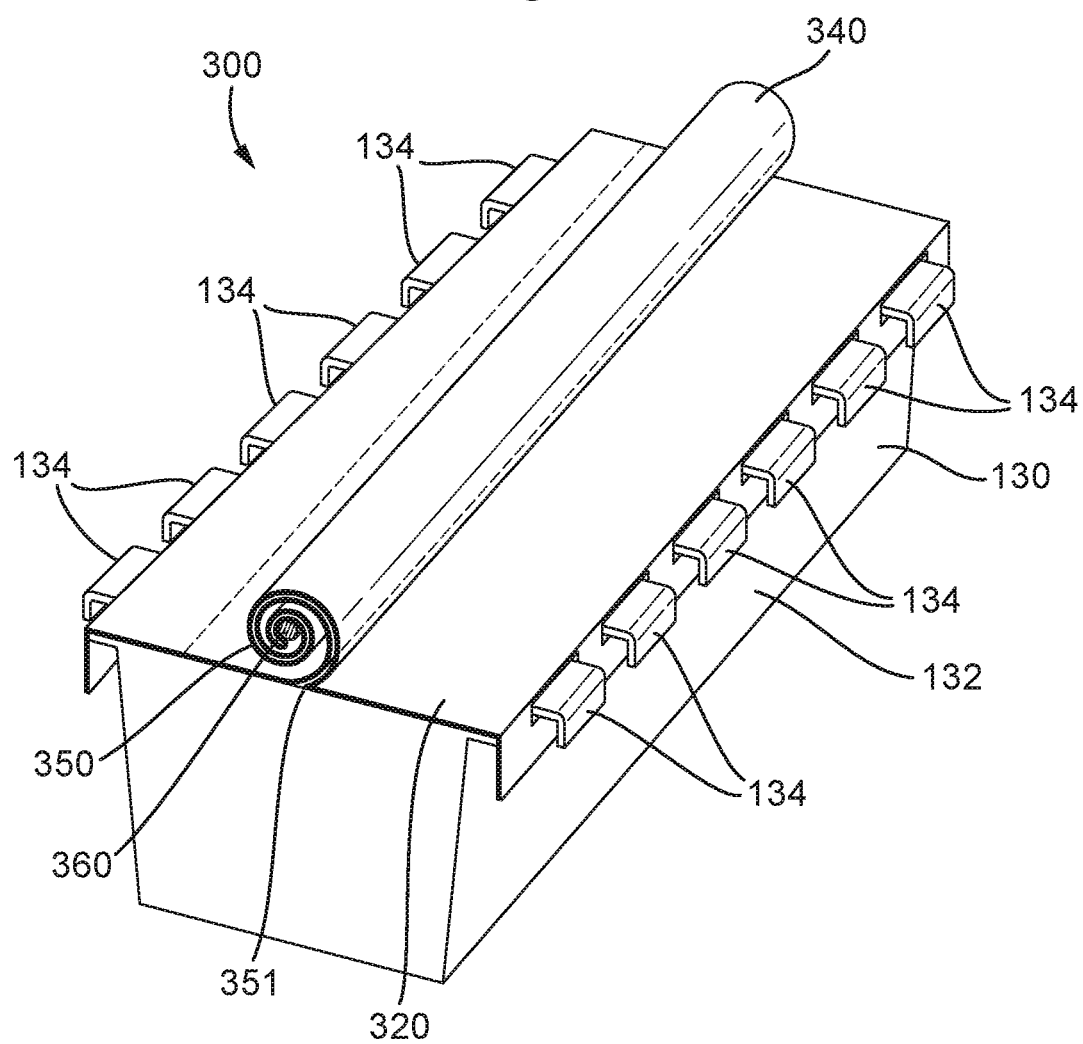
FIG. 5 is a schematic perspective view of a vehicle airbag assembly including a flexible membrane according to a third example of the present disclosure.

With reference to FIG. 5, a vehicle airbag assembly 300 according to a third example of the present disclosure will now be described. The vehicle airbag assembly 300 includes a flexible membrane cover 320 and a spacer portion 340 formed from a gathering of material 350. Where compatible any of the features of the previous examples may apply to the third example.

As for the second example, the gathering of material 350 is rolled around itself so as to form a spiral. However, in the third example the spacer portion 340 additionally includes a rigid or semi-rigid element 360 about which the gathering of material is wound around. The element 360 may be similar to the element 160 described in respect of the first example and features of the element 160 may apply equally to element 360. The roll of material forming the spiral may be held together at its root 351 by stitching, an adhesive, welding or any other form of connection. Furthermore, the gathering of material 350 may or may not be joined to the element 360, e.g., by virtue of stitching, an adhesive, welding or any other form of connection.

Figure 6:
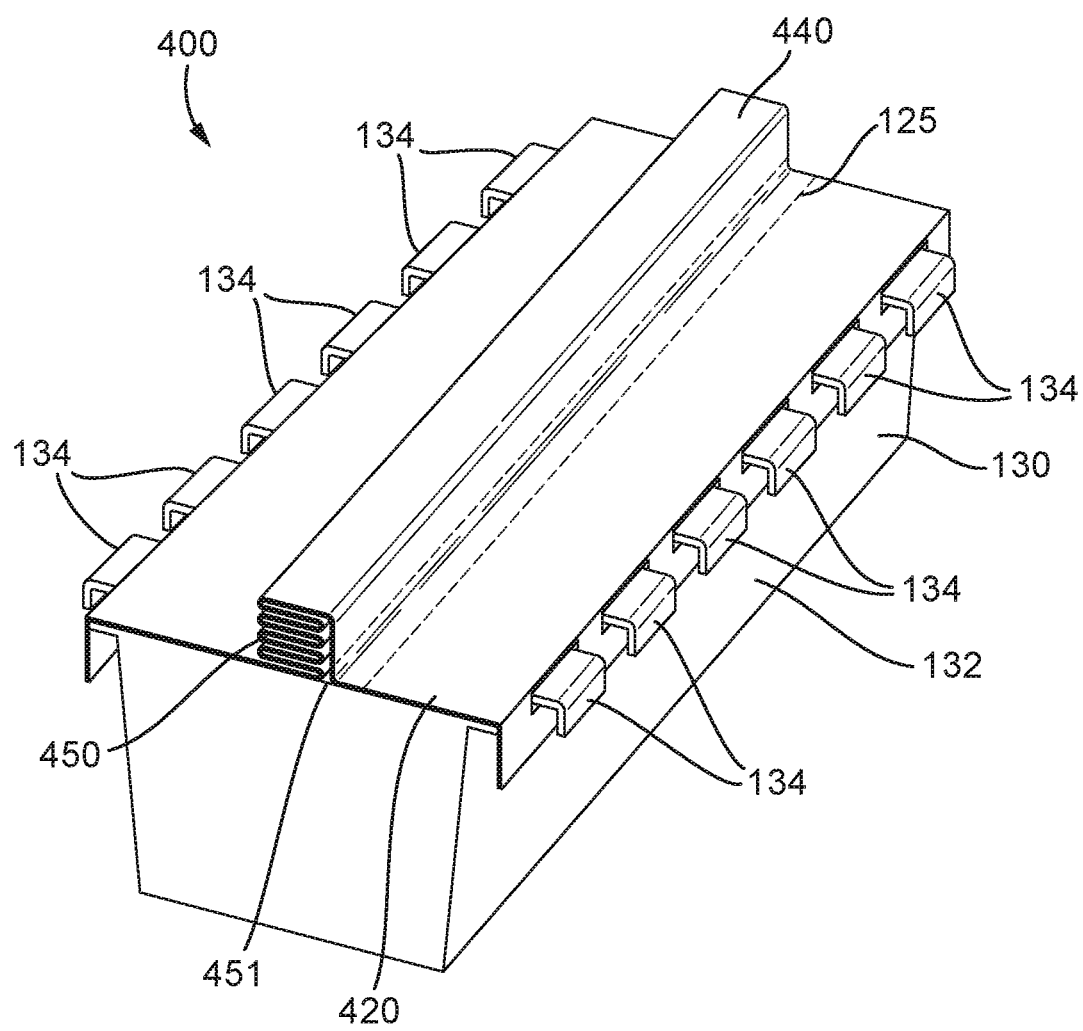
FIG. 6 is a schematic perspective view of a vehicle airbag assembly including a flexible membrane according to a fourth example of the present disclosure.

With reference to FIG. 6, a vehicle airbag assembly 400 according to a fourth example of the present disclosure will now be described. The vehicle airbag assembly 400 includes a flexible membrane cover 420 and a spacer portion 440 formed from a gathering of material 450. Where compatible any of the features of the previous examples may apply to the fourth example.

Rather than being rolled, the gathering of material 450 may be folded to form multiple layers. FIG. 6 depicts the layers being disposed substantially parallel to the membrane cover 420, but it is equally envisaged that the layers may be substantially perpendicular or at any other angle relative to the membrane cover 420. Layers formed from folds on one side of the gathering may be interleaved with layers formed from folds on another side of the gathering. As for the previous examples, the folded layers may be held together at their root 451 by stitching, an adhesive, welding or any other form of connection. Furthermore, adjacent layers may be joined together, e.g., by stitching, an adhesive, welding or any other form of connection.

Figure 7:
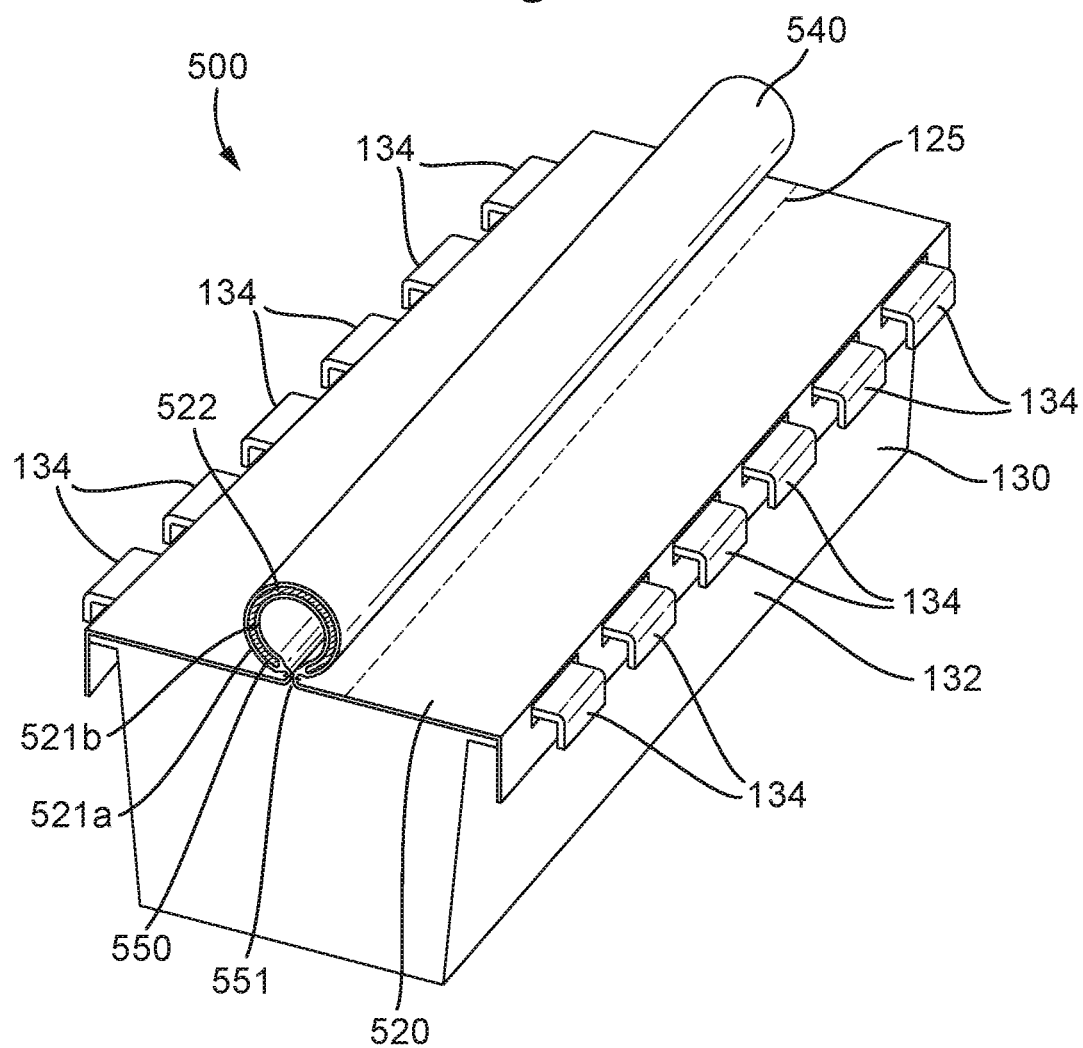
FIG. 7 is a schematic perspective view of a vehicle airbag assembly including a flexible membrane according to a fifth example of the present disclosure.

With reference to FIG. 7, a vehicle airbag assembly 500 according to a fifth example of the present disclosure will now be described. The vehicle airbag assembly 500 includes a flexible membrane cover 520 and a spacer portion 540 formed from a gathering of material 550. Where compatible any of the features of the previous examples may apply to the fifth example.

As for the first example, the spacer portion 540 of the fifth example may include a portion of the flexible membrane cover 520 that is rolled up to form a roll that extends lengthways along the canister 130. The roll of material may be held together at its root 551 by stitching, an adhesive, welding or any other form of connection.

In the fifth example, the flexible membrane cover 520 may include two or more layers 521a, 521b, at least where the membrane cover forms the spacer portion 520. The spacer portion 520 may include a stiffening feature 522, e.g., layer, provided between the two layers 521a, 521b of the flexible membrane. The stiffening feature 522 may be formed from a lightweight material, such as a foam-type material, or any other material that adds rigidity to the gathering of material 150.

Figure 8:
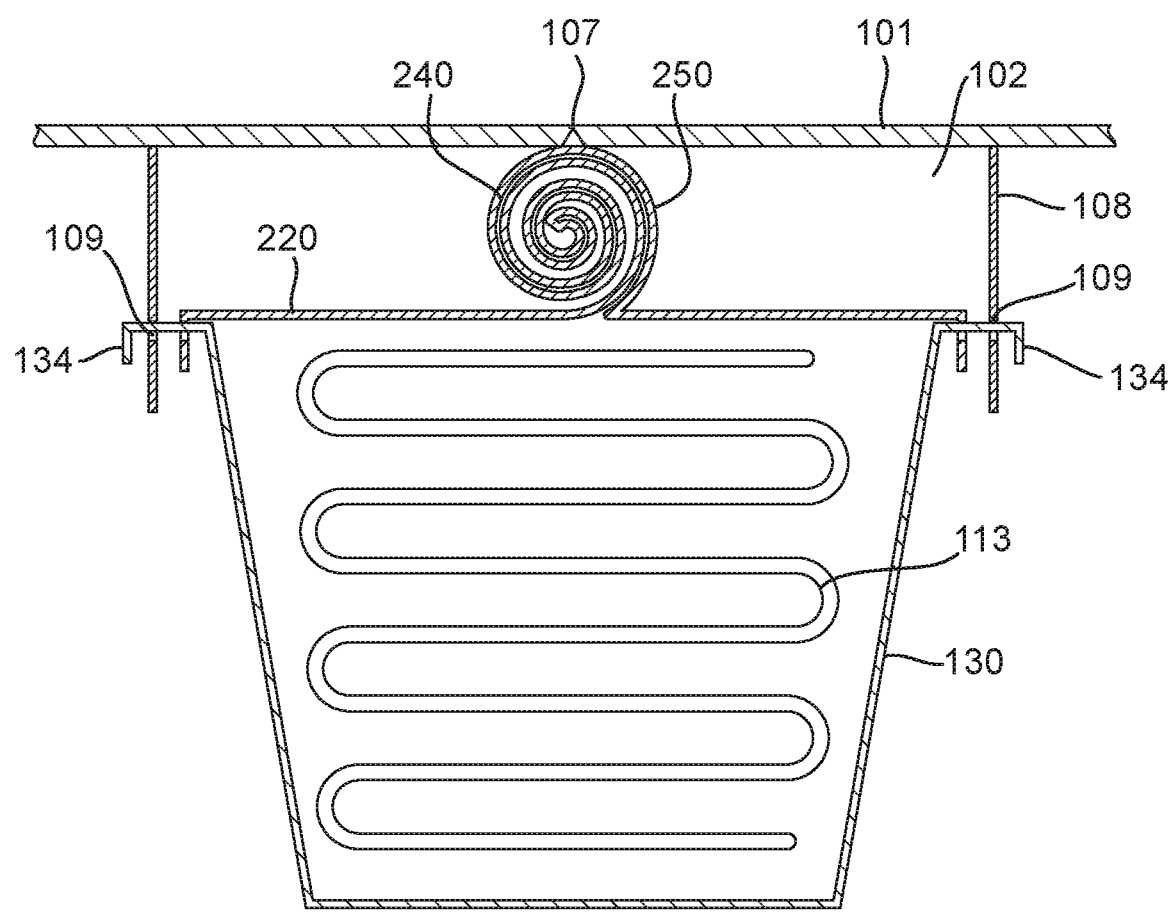
FIG. 8 is a side sectional view of the vehicle airbag assembly including the flexible membrane according to the second example of the present disclosure.

FIG. 8 shows the spacer portion 240 of the second example residing within a gap 102 between the trim panel 101 and the airbag canister 130 such that the spacer portion resists deflection of the trim panel. (FIG. 8 depicts the spacer portion 240 of the second example of the present disclosure, but it will be apparent that any of the above-mentioned spacer portions may reside within the gap 102 to resist deflection of the trim panel 101.) The spacer portion 240 may be sized such that it spans the gap 102 and touches the trim panel 101. The spacer portion 240 may be provided in line with the tear seam 107. When the airbag 113 is deployed the pressure of the airbag breaks (e.g., tears) both the frangible portion 125 in the membrane cover 220 and the tear seam 107 of the trim panel 101. The split membrane cover 220 may move out of the way of the airbag 113 as it passes through the opening and the lightweight nature of the spacer portion 240 does not impede progress of the airbag. The spacer portion 240, if not bonded together, may also unravel.

With reference to FIG. 9, the present disclosure may also relate to a method 900 of forming any of the above-mentioned vehicle airbag assemblies. The method includes a first step 901 in which an opening of the airbag canister 130 is covered with any of the aforementioned flexible membrane covers 120, 220, 320, 420, 520. In a second step 902, any of the above-described spacer portions 140, 240, 340, 440, 540 may be coupled to the membrane cover. The flexible membrane cover may include or have attached thereto any of the aforementioned spacer portions 140, 240, 340, 440, 540. As such, the second step 902 may be performed concurrently with the first step 901. In a third step 903, the airbag canister 130 may be attached to the vehicle trim panel 101. The spacer portion may reside within the gap 102 between the trim panel and the airbag container such that the spacer portion resists deflection of the trim panel.

The method 900 may further include retro-fitting the flexible membrane cover 120, 220, 320, 420, 520 and spacer portion 140, 240, 340, 440, 540 to an existing airbag canister 130.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

The invention claimed is:

1. An assembly, comprising:
an airbag inflatable from an uninflated position to an inflated position;
a trim panel;
an airbag container having a sidewall defining a cavity receiving the airbag;
the airbag container having an opening through which the airbag is deployable;
a flexible membrane cover extending over the opening; and
a spacer portion coupled to the membrane cover, the spacer portion being configured to extend proud of the sidewall;
the spacer portion residing within a gap between the trim panel and the airbag container and touches the trim panel when the airbag is in the uninflated position to resist deflection of the trim panel; and
the trim panel including a tear seam and the spacer portion touches the trim panel at the tear seam when the airbag is in the uninflated position.

2. The assembly of claim 1, wherein the spacer portion includes a gathering of material.

3. The assembly of claim 2, wherein the gathering of material is formed from the flexible membrane cover with a portion of the flexible membrane cover being gathered to form at least a portion of the spacer portion.

4. The assembly of claim 2, wherein the gathering of material is held in place by stitching.

5. The assembly of claim 2, wherein the spacer portion includes an element that is rigid relative to the membrane cover and the gathering of material is gathered around the element.

6. The assembly of claim 5, wherein the element is of a first material and the membrane cover is of another material.

7. The assembly of claim 5, wherein the element is a foam material.

8. The assembly of claim 1, wherein the spacer portion includes an element that is rigid relative to the membrane cover.

9. The assembly of claim 1, wherein the flexible membrane cover includes two or more layers, the spacer portion including a stiffening feature between the layers of the flexible membrane cover.

10. The assembly of claim 1, wherein the spacer portion is elongate.

11. The assembly of claim 10, wherein the spacer portion extends in a direction substantially parallel to a longitudinal axis of the airbag container.

12. The assembly of claim 1, wherein the spacer portion spans the container opening.

13. The assembly of claim 1, wherein the flexible membrane cover includes a frangible portion configured to break upon deployment of the airbag.

14. The assembly of claim 13, wherein the frangible portion includes a series of perforations.

15. The assembly of claim 13, wherein the frangible portion is at the spacer portion.

16. The assembly of claim 13, wherein the membrane cover comprises at least one opening configured to receive a corresponding tab provided on the sidewall.

17. The assembly of claim 16, wherein the tab is configured to engage a corresponding opening on the trim panel.

18. The assembly of claim 1, wherein the trim panel includes a perimeter wall extending from an inner surface of the trim panel, and wherein the perimeter wall is configured to receive the airbag container and substantially surround the opening.

19. The assembly of claim 1, wherein the spacer portion includes a gathering of material of the flexible membrane cover rolled around itself so as to form a spiral.

20. The assembly of claim 1, wherein the gathering of material of the flexible membrane is held together by a connection.

* * * * *